United States Patent
Ishii et al.

(10) Patent No.: US 7,856,241 B2
(45) Date of Patent: Dec. 21, 2010

(54) MOBILE COMMUNICATION SYSTEM, RADIO BASE STATION, SCHEDULING APPARATUS, SCHEDULING METHOD EMPLOYED IN THE SAME, AND PROGRAM THEREOF

(75) Inventors: Naoto Ishii, Tokyo (JP); Kojiro Hamabe, Tokyo (JP); Takahiro Nobukiyo, Tokyo (JP); Nahoko Takano, Tokyo (JP)

(73) Assignee: NEC Corporation, Tokyo (JP)

( * ) Notice: Subject to any disclaimer, the term of this patent is extended or adjusted under 35 U.S.C. 154(b) by 1039 days.

(21) Appl. No.: 10/935,424

(22) Filed: Sep. 8, 2004

(65) Prior Publication Data

US 2005/0063341 A1 Mar. 24, 2005

(30) Foreign Application Priority Data

Sep. 24, 2003 (JP) .............................. 2003-330831

(51) Int. Cl.
*H04B 7/00* (2006.01)
(52) U.S. Cl. ...................... 455/513; 455/450; 455/451; 455/452.1; 455/453; 370/395.3
(58) Field of Classification Search . 370/395.4–395.43; 455/513, 450–453
See application file for complete search history.

(56) References Cited

U.S. PATENT DOCUMENTS

| | | | |
|---|---|---|---|
| 2002/0086694 A1* | 7/2002 | Tran ............................ | 455/522 |
| 2003/0002518 A1* | 1/2003 | Shibutani ..................... | 370/442 |
| 2003/0058881 A1* | 3/2003 | Wu et al. ..................... | 370/444 |
| 2003/0081627 A1* | 5/2003 | Bao et al. .................... | 370/444 |

(Continued)

FOREIGN PATENT DOCUMENTS

CN 1347201 A 5/2002

(Continued)

OTHER PUBLICATIONS

3rd Generation Partnership Project; Technical Specification Group Radio Access Network; Physical layer aspects of UTRA High Speed Downlink Packet Access (Release 4) (2001).

(Continued)

*Primary Examiner*—Edward Urban
*Assistant Examiner*—Fayyaz Alam
(74) *Attorney, Agent, or Firm*—Dickstein Shapiro LLP (57) ABSTRACT

The invention provides a radio base station which can achieve high throughput while attaining the target quality for each mobile station and fairly assigning a transmission opportunity. In the radio base station, when a mobile station selection unit is notified at a fixed period of time by a data flow control unit with respect to a mobile station which has data to be transmitted, the unit selects a plurality of mobile stations which don't achieve the service quality. The plurality of mobile stations selected by the mobile station selection unit are input into a PF scheduler. From these mobile stations, a mobile station to which a transmission opportunity is assigned, is determined. A mobile station notification unit assigns a transmission opportunity to the mobile station determined by the PF scheduler. Upon completion of the transmission opportunity assignment, the mobile station notification unit notifies the data flow control unit of the mobile stations to which a transmission opportunity has been assigned.

25 Claims, 6 Drawing Sheets

U.S. PATENT DOCUMENTS

| | | | |
|---|---|---|---|
| 2003/0133457 A1* | 7/2003 | Ono et al. | 370/395.4 |
| 2004/0082363 A1* | 4/2004 | Hosein | 455/560 |
| 2004/0258070 A1* | 12/2004 | Arima | 370/395.4 |

FOREIGN PATENT DOCUMENTS

| | | | |
|---|---|---|---|
| EP | 0 877 512 A3 | | 11/2000 |
| EP | 1330080 A2 | * | 7/2003 |
| EP | 1 330 080 A3 | | 2/2004 |
| GB | 2 407 235 A | | 4/2005 |
| JP | 2002-078012 | | 3/2002 |
| JP | 2002-253515 | * | 8/2002 |
| JP | 2003-009223 | | 1/2003 |
| JP | 2003-209887 | | 7/2003 |
| JP | 2003-229894 | | 8/2003 |
| WO | WO-02/39760 | | 5/2002 |
| WO | WO 02/085054 A2 | | 10/2002 |

OTHER PUBLICATIONS

Jalali, A., et al.; "Data Throughput of CDMA-HDR a High Efficiency-High Data Rate Personal Communication Wireless System"; IEEE 51st Vehicular Technology Conference; 2000.

3GPP TR25.848 V.4.0.0 (Mar. 2001); "Physical layer aspects of UTRA High Speed Downlink Packet Access"; pp. 69-70, A.3.5 Packet Scheduler.

* cited by examiner

MOBILE COMMUNICATION SYSTEM, RADIO BASE STATION, SCHEDULING APPARATUS, SCHEDULING METHOD EMPLOYED IN THE SAME, AND PROGRAM THEREOF

BACKGROUND OF THE INVENTION

1. Field of the Invention

The present invention relates to a mobile communication system, a radio base station, a scheduling apparatus, a scheduling method employed in the same and a program thereof, and more particularly to a packet scheduling method of the radio base station in the mobile communication system which performs packet communication.

2. Description of the Prior Art

In recent years, in a mobile communication system, as data communication such as Internet browsing and electronic mail including images (still image and moving image) increases, the demand for data communication is on the rise. In W-CDMA (Wideband Code Division Multiple Access) as the third-generation mobile communication system, the standardization of HSDPA (High Speed Downlink Packet Access) which implements high-speed downlink packet communication is under way by 3GPP ($3^{rd}$ Generation Partnership Project).

In the HSDPA, which implements high-speed packet communication in downlink shared channel, since a radio base station assigns a transmission opportunity to a plurality of mobile stations in accordance with downlink radio channel quality, the throughput can be improved by user multiplex effect. The method of assigning a transmission opportunity is termed a scheduling. The following methods are known as representative ones.

Max. C/I [Maximum CIR (Carrier to Interference power Ratio)] method (for example, refer to non-patent document 1) assigns a slot to a mobile station in which the radio channel quality is highest with respect to mobile stations in a waiting state for transmitting a packet. In this method, the throughput performance can be considerably increased. However, the frequency of assigning a transmission opportunity to a mobile station in which the radio channel quality is not satisfactory because it is located at places such as the boundary of a cell, may be reduced.

PF (Proportional Fairness) method (for example, refer to non-patent document 2) is a scheduling method which aims at fairly assigning a transmission opportunity to a mobile station in a waiting state for transmitting a packet. In this method, for example, "instantaneous radio channel quality/average radio channel quality" of mobile stations is determined as a metric so as to assign a transmission opportunity to a mobile station in which the metric is large.

According to the PF method, since relative quality with respect to average radio channel-quality is employed as an indicator, it is possible to assign a transmission opportunity even to a mobile station in which the average radio channel quality is low.

(Non-patent document 1) 3GPP TR25.848 V.4.0.0 (2001-03), "Physical layer aspects of UTRA High Speed Downlink Packet Access", pp. 69-70, A.3.5 Packet scheduler (Non-patent document 2) A. Jalali et al., "Data Throughput of CDMA-HDR a High Efficiency-High Data Rate Personal Communication Wireless System", IEEE $51^{st}$ Vehicular Technology Conference (2000)

In the conventional scheduling methods, however, while the radio channel quality of a mobile station is taken into consideration to improve the throughput, quality guarantee for each service is not considered, when a transmission opportunity is assigned to the mobile station.

In the future communication service, when the quality guarantee for each service is needed, the service quality (QoS: Quality of Service) may not be satisfied. According to the PF method, if a ratio of a measured transmission rate to a predetermined transmission rate is employed as a metric, the service quality can be satisfied, for example.

In this case, however, since the condition for assigning a transmission opportunity does not take the radio channel quality into consideration, a transmission opportunity is assigned even when the radio channel quality is low, thereby reducing the throughput. Consequently, in the conventional scheduling methods, it is difficult to simultaneously achieve the service quality guarantee and the improvement of throughput.

BRIEF SUMMARY OF THE INVENTION

Accordingly, an object of the present invention is to provide a mobile communication system, a radio base station, a scheduling apparatus, a scheduling method employed in the same, and a program thereof, which can achieve high throughput while overcoming the foregoing problems, attaining the quality guarantee for each mobile station, and fairly assigning a transmission opportunity.

A mobile communication system according to the present invention comprises a plurality of mobile stations which notify of radio channel quality notification by use of an uplink dedicated channel and a radio base station which communicates with the plurality of mobile stations and transmits a packet to the plurality of mobile stations by use of a downlink shared channel. The radio base station includes selecting means selecting a plurality of mobile stations in accordance with a transmission state of the packet and deciding means deciding on a mobile station to which a transmission opportunity is assigned in accordance with a metric which is based on the radio channel quality notification, with respect to the plurality of mobile stations selected by the selecting means.

Another mobile communication system according to the present invention comprises a plurality of mobile stations which notify of radio channel quality notification by use of an uplink dedicated channel and a radio base station which communicates with the plurality of mobile stations and transmits a packet to the plurality of mobile stations by use of a downlink shared channel. The radio base station includes selecting means selecting a plurality of mobile stations in which the transmission state of the packet satisfies a given condition which is predetermined, first deciding means deciding on a mobile station to which a transmission opportunity is assigned in accordance with a metric which is based on the radio channel quality notification, with respect to the plurality of mobile stations selected by the selecting means, and second deciding means deciding on a mobile station to which a transmission opportunity is assigned in accordance with the radio channel quality, if the mobile station is not selected by the selecting means.

A radio base station according to the present invention communicates with a plurality of mobile stations which notify of radio channel quality notification by use of an uplink dedicated channel and transmits a packet to the plurality of mobile stations by use of a downlink shared channel. The radio base station includes selecting means for selecting a plurality of mobile stations in accordance with a transmission state of the packet and deciding means for deciding on a mobile station to which a transmission opportunity is assigned in accordance with a metric which is based on the radio channel quality notification, with respect to the plurality of mobile stations selected by the selecting means.

Another radio base station according to the present invention communicates with a plurality of mobile stations which notify of radio channel quality notification by use of an uplink dedicated channel and transmits a packet to the plurality of mobile stations by use of a downlink shared channel. The radio base station includes selecting means for selecting a plurality of mobile stations in which the transmission state of the packet satisfies a given condition which is predetermined, first deciding means deciding on a mobile station to which a transmission opportunity is assigned in accordance with a metric which is based on the radio channel quality notification, with respect to the plurality of mobile stations selected by the selecting means, and second deciding means for deciding on a mobile station to which a transmission opportunity is assigned in accordance with the radio channel quality, if the mobile station is not selected by the selecting means.

A scheduling apparatus according to the present invention performs scheduling of a packet in a mobile communication system which comprises a plurality of mobile stations which notify of radio channel quality notification by use of an uplink dedicated channel and a radio base station which communicates with the plurality of mobile stations and transmits the packet to the plurality of mobile stations by use of a downlink shared channel. The scheduling apparatus includes selecting means selecting a plurality of mobile stations in accordance with a transmission state of the packet and deciding means deciding on a mobile station to which a transmission opportunity is assigned in accordance with a metric which is based on the radio channel quality notification, with respect to the plurality of mobile stations selected by the selecting means.

Another scheduling apparatus according to the present invention performs scheduling of a packet in a mobile communication system which comprises a plurality of mobile stations which notify of radio channel quality notification by use of an uplink dedicated channel and a radio base station which communicates with the plurality of mobile stations and transmits the packet to the plurality of mobile stations by use of a downlink shared channel. The scheduling apparatus includes selecting means selecting a plurality of mobile stations in which the transmission state of the packet satisfies a given condition which is predetermined, first deciding means deciding on a mobile station to which a transmission opportunity is assigned in accordance with a metric which is based on the radio channel quality notification, with respect to the plurality of mobile stations selected by the selecting means, and second deciding means deciding on a mobile station to which a transmission opportunity is assigned in accordance with the radio channel quality, if the mobile station is not selected by the selecting means.

A scheduling method according to the present invention performs scheduling of a packet in a mobile communication system which comprises a plurality of mobile stations which notify of radio channel quality notification by use of an uplink dedicated channel and a radio base station which communicates with the plurality of mobile stations and transmits the packet to the plurality of mobile stations by use of a downlink shared channel. The radio base station includes a first step of selecting a plurality of mobile stations in accordance with a transmission state of the packet and a second step of deciding on a mobile station to which a transmission opportunity is assigned in accordance with a metric which is based on the radio channel quality notification, with respect to the plurality of mobile stations thus selected.

Another scheduling method according to the present invention performs scheduling of a packet in a mobile communication system which comprises a plurality of mobile stations which notify of radio channel quality notification by use of an uplink dedicated channel and a radio base station which communicates with the plurality of mobile stations and transmits the packet to the plurality of mobile stations by use of a downlink shared channel. The radio base station includes a first step of selecting a plurality of mobile stations in which the transmission state of the packet satisfies a given condition which is predetermined, a second step of deciding on a mobile station to which a transmission opportunity is assigned in accordance with a metric which is based on the radio channel quality notification, with respect to the plurality of mobile stations thus selected, and a third step of deciding on a mobile station to which a transmission opportunity is assigned in accordance with the radio channel quality, if the mobile station is not selected by the first step.

According to the present invention, there is provided a program of the scheduling method for performing scheduling of a packet in a mobile communication system which comprises a plurality of mobile stations which notify of radio channel quality notification by use of an uplink dedicated channel, and a radio base station which communicates with the plurality of mobile stations and transmits the packet to the plurality of mobile stations by use of a downlink shared channel. The program enables a computer of the radio base station to execute a first process for selecting a plurality of mobile stations in accordance with a transmission state of the packet and a second process for deciding on a mobile station to which a transmission opportunity is assigned in accordance with a metric which is based on the radio channel quality notification, with respect to the plurality of mobile stations thus selected.

According to the present invention, there is provided another program of the scheduling method for performing scheduling of a packet in a mobile communication system which comprises a plurality of mobile stations which notify of radio channel quality notification by use of an uplink dedicated channel, and a radio base station which communicates with the plurality of mobile stations and transmits the packet to the plurality of mobile stations by use of a downlink shared channel. The program enables a computer of the radio base station to execute a first process for selecting a plurality of mobile stations in which the transmission state of the packet satisfies a given condition which is predetermined, a second process for deciding on a mobile station to which a transmission opportunity is assigned in accordance with a metric which is based on the radio channel quality notification, with respect to the plurality of mobile stations thus selected, and a third process for deciding on a mobile station to which a transmission opportunity is assigned in accordance with the radio channel quality, if the mobile station is not selected by the above selecting process.

Specifically, according to the scheduling method of the present invention, there is provided a packet scheduling method for a base station communicating with a plurality of mobile stations which notify of radio channel quality notification by use of an uplink dedicated channel and transmitting a packet to the plurality of mobile stations by use of a downlink shared channel. According to this method, a plurality of mobile stations are selected in accordance with service quality, and a mobile station to which a transmission opportunity is assigned is determined by the PF (Proportional Fairness) method with respect to the mobile stations thus selected.

In addition, according to the scheduling method of the present invention, there is provided a packet scheduling method for the base station communicating with a plurality of mobile stations which notify of radio channel quality notification by use of an uplink dedicated channel and transmitting a packet to the plurality of mobile stations by use of a downlink shared channel. According to this method, a plurality of mobile stations are selected in accordance with service quality, and a mobile station to which a transmission opportunity is assigned is determined from the selected mobile stations by the PF (Proportional Fairness) method. In this case, when it is not possible to select a mobile station in accordance with the service quality, a mobile station to which a transmission opportunity is assigned is determined by the Max. C/I [Maximum CIR] method.

According to the scheduling method of the present invention, a plurality of mobile stations are selected in accordance with the service quality. Therefore, as the service quality of a mobile station is lower, the probability of assigning a transmission opportunity to the mobile station is higher.

In addition, according to the scheduling method of the present invention, since there is determined a mobile station to which a transmission opportunity is assigned in accordance with the metric which is calculated from the radio channel quality, with respect to the plurality of mobile stations thus selected, it is possible to avoid that a transmission opportunity is assigned only to a mobile station having satisfactory instantaneous radio channel quality.

In other words, according to the scheduling method of the present invention, as the service quality of a mobile station is lower and the radio channel quality is higher, the probability of assigning a transmission opportunity to the mobile station is higher. Thus, the improvement of the service quality and throughput may be expected.

In addition, according to the scheduling method of the present invention, since a mobile station is selected by the PF method, it is also possible to maintain the fairness with respect to the transmission opportunity assignment. In this case, according to the scheduling method of the present invention, when the service quality of all mobile stations which communicate, achieves predetermined quality, since a transmission opportunity is assigned to a mobile station in which the instantaneous radio channel quality is highest, the improvement of the throughput may be expected as compared with the case where only the PF method is applied.

According to the present invention, the provision of configuration and operation which will be hereunder described offers the advantages of achieving high throughput while attaining the quality guarantee for each mobile station and fairly assigning a transmission opportunity.

DETAILED DESCRIPTION OF THE PREFERRED EMBODIMENTS

Figure 1:
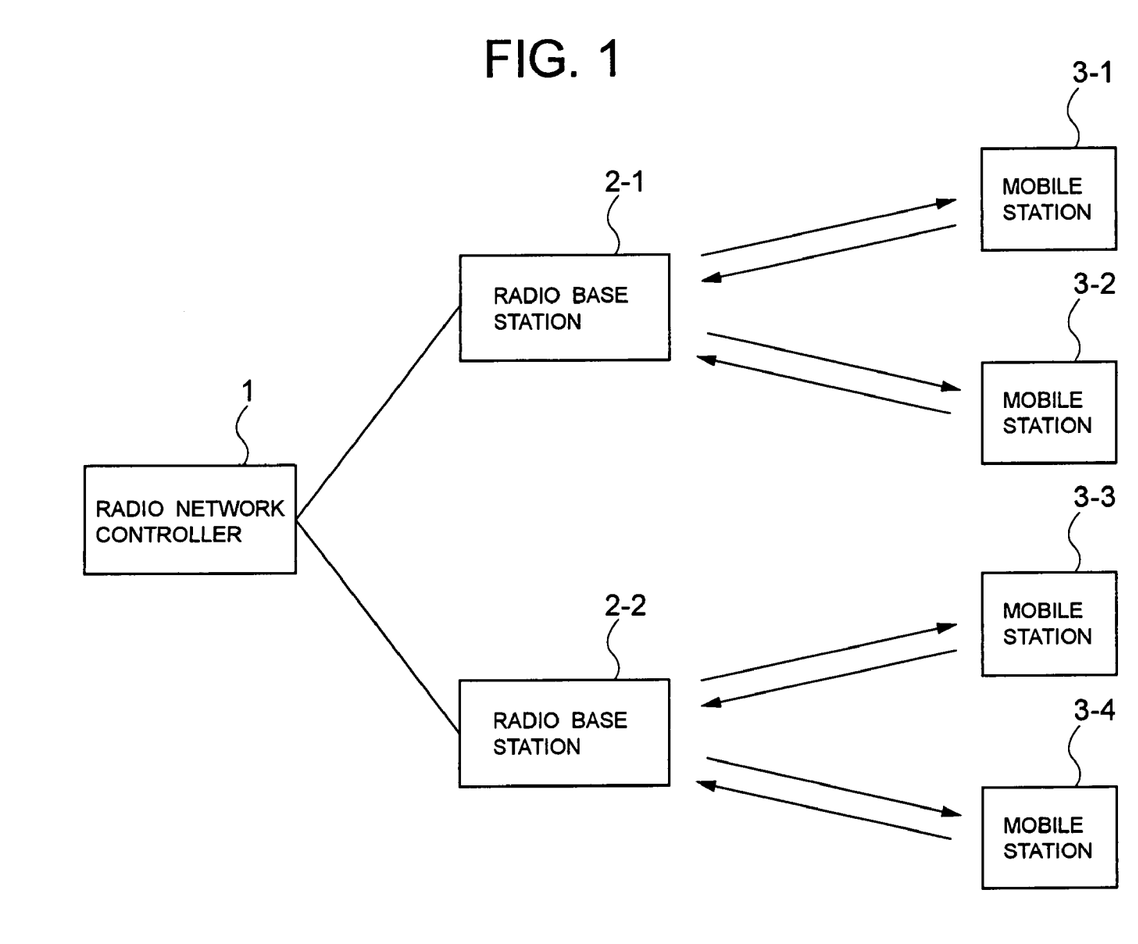
FIG. 1 is a block diagram showing the configuration of a mobile communication system according to an embodiment of the present invention.

The present invention will be more fully understood from the following description of preferred embodiments when reference is made to the accompanying drawings. FIG. 1 is a block diagram showing the configuration of a mobile communication system according to one embodiment of the present invention. Referring to FIG. 1, the mobile communication system according to one embodiment of the present invention comprises a radio network controller 1, radio base stations 2-1, 2-2, mobile stations 3-1 to 3-4.

The radio network controller 1 is connected to a plurality of radio base stations 2-1, 2-2. The base stations 2-1, 2-2 are connected to a plurality of mobile stations 3-1 to 3-4 via radio channel.

Figure 2:
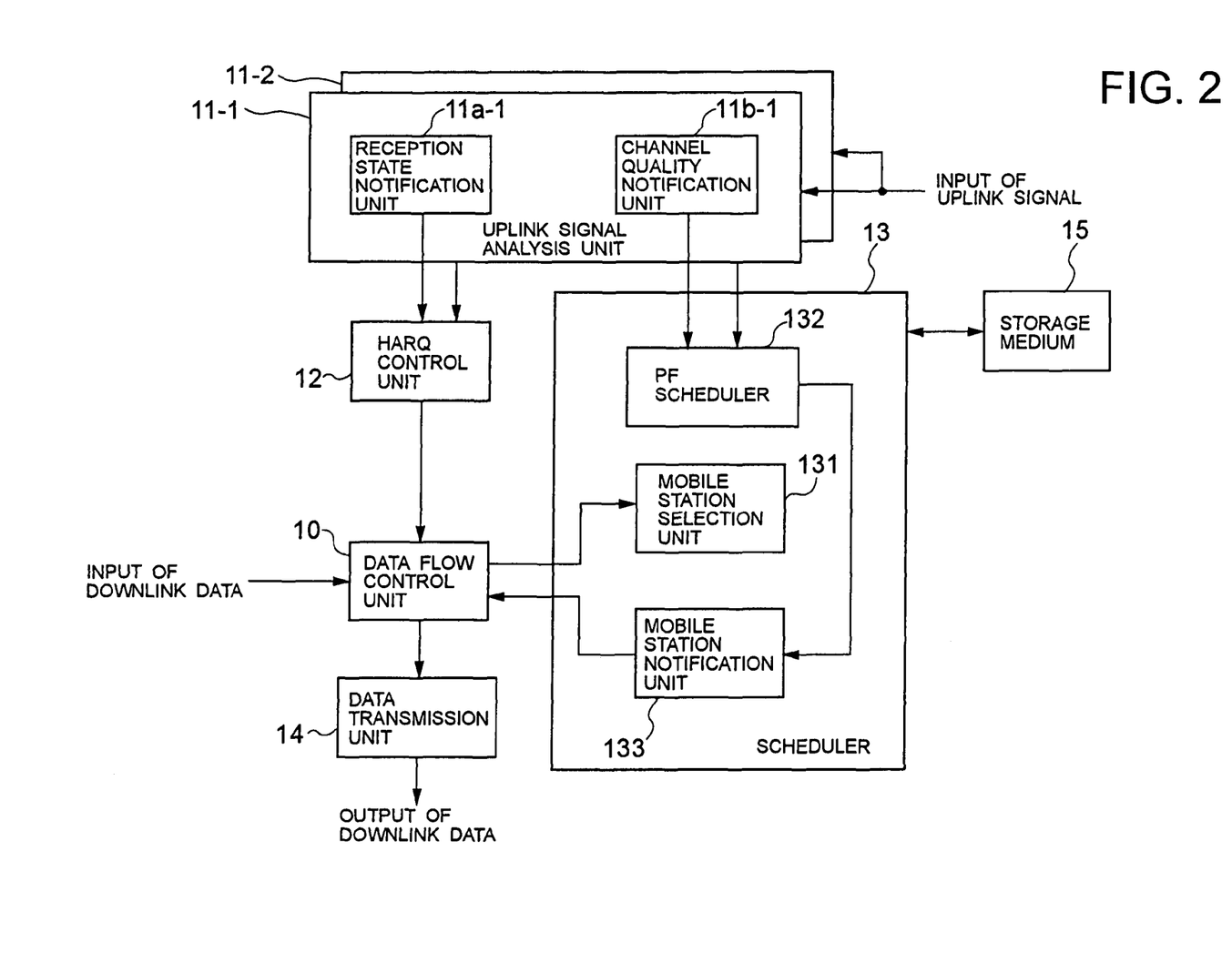
FIG. 2 is a block diagram showing the configuration of a radio base station shown in FIG. 1.

FIG. 2 is a block diagram showing the configuration of the radio base stations 2-1, 2-2 shown in FIG. 1. Shown in FIG. 2 is an exemplary configuration in which two of the mobile stations 3-1 to 3-4 are connected to the radio base stations 2-1, 2-2 (commonly referred to below as "radio base station 2"), shown in FIG. 1, respectively.

The radio base station 2 comprises a data flow control unit 10, uplink signal analysis units 11-1, 11-2, a HARQ (Hybrid Automatic Repeat reQuest) control unit 12, a scheduler 13, a data transmission unit 14, and a storage medium 15.

The uplink signal analysis units 11-1, 11-2 are provided for each of the mobile stations 3-1 to 3-4 and comprise reception state notification units 11a-1, 11a-2 (a reception state notification unit 11a-2 is not shown) and channel quality notification units 11b-1, 11b-2 (a channel quality notification unit 11b-2 is not shown).

The scheduler 13 comprises a mobile station selection unit 131, a PF (Proportional Fairness) scheduler 132, and a mobile station notification unit 133.

The data flow control unit 10 is connected to the radio network controller 1, the HARQ control unit 12, the scheduler 13, and the data transmission unit 14, respectively. In the uplink signal analysis units 11-1, 11-2, the reception state notification units 11a-1, 11a-2 are connected to the HARQ control unit 12, and the channel quality notification units 11b-1, 11b-2 are connected to the PF scheduler 132 in the scheduler 13.

While the storage medium 15 is connected to the scheduler 13, in addition to a program (a program executable in a computer) which is executed in the scheduler 13, programs which are executed in the data flow control unit 10, the uplink signal analysis units 11-1, 11-2, the HARQ control unit 12, and the data transmission unit 14 are also stored in the storage medium 15.

The radio base station 2 which has received an uplink signal analyzes the uplink signal by means of the uplink signal analysis units 11-1, 11-2 provided for each of the mobile stations 3-1 to 3-4. Since the uplink signal has reception state and channel quality, the analysis results from the reception state notification units 11a-1, 11a-2 and the channel quality notification units 11b-1, 11b-2 are sent to the HARQ control unit 12 and the scheduler 13, respectively.

The HARQ control unit 12 decides whether or not retransmission is needed in accordance with the analysis results from the reception state notification units 11a-1, 11a-2 and sends the resultant judgment to the data flow control unit 10.

Upon receipt of data from the radio network controller 1, the data flow control unit 10 stores the data in a buffer whose data has not been transmitted (not shown) and sends the data to the data transmission unit 14 in response to an instruction from the mobile station notification unit 133.

When transmitting the data in the buffer whose data has not been transmitted, the data flow control unit 10 moves the data from the buffer whose data has not been transmitted to a buffer whose data has been transmitted (not shown). When the data flow control unit 10 transmits the data in the buffer whose data has been transmitted (a retransmission case), it transmits data from the buffer whose data has been transmitted, and then stores the data as is.

The data transmission unit 14 applies error correction code with respect to the data from the data flow control unit 10 and modulates the corrected data to transmit it to the corresponding mobile stations 3-1 to 3-4.

On the other hand, when the data flow control unit 10 receives from the HARQ control unit 12 some notification that retransmission is not required, the control unit 10 discards the data which have been stored in the buffer whose data has been transmitted. In contrast, when the data flow control unit 10 receives from the HARQ control unit 12 some notification that retransmission is required, the data remains stored in the buffer whose data has been transmitted.

Figure 3:
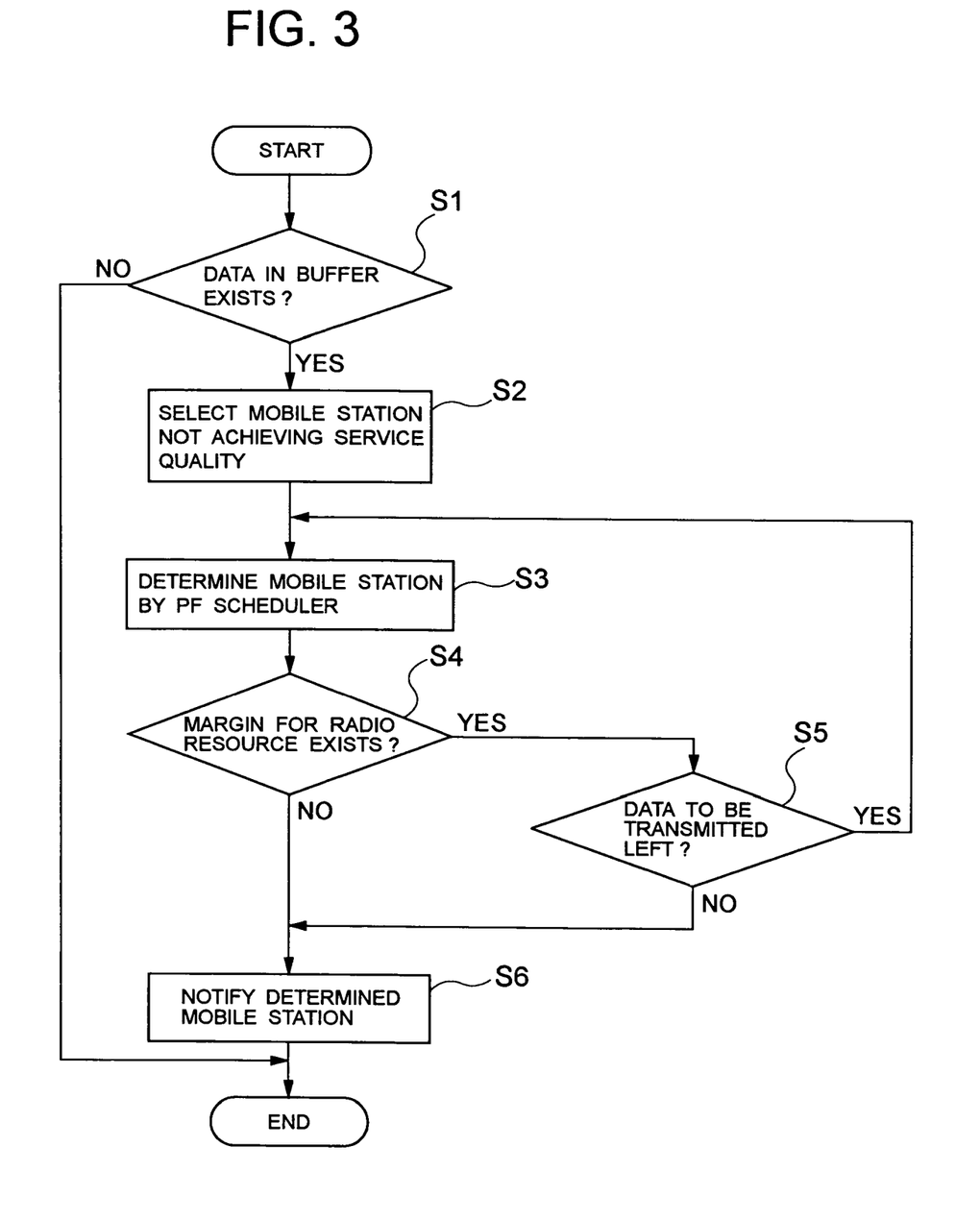
FIG. 3 is a flowchart illustrating the operation of a scheduler shown in FIG. 2.

FIG. 3 is a flowchart illustrating the operation of the scheduler 13 shown in FIG. 2. The operation of the scheduler 13 will be described hereunder with reference to FIG. 2 and FIG. 3. It is noted that the operation shown in FIG. 3 is implemented when the scheduler 13 executes the program stored in the storage medium 15.

When the mobile station selection unit 131 is notified by the data flow control unit 10 at a fixed period of time (packet transmission period) with respect to a mobile station which has data to be transmitted (Step S1 in FIG. 3), the unit 131 selects a plurality of mobile stations which don't satisfy the service quality (Step S2 in FIG. 3). The plurality of mobile stations selected by the mobile station selection unit 131 are input into the PF scheduler 132. From these mobile stations, a mobile station to which a transmission opportunity is assigned, is determined (Step S3 in FIG. 3).

The service quality as used herein represents the extent to which target quality is achieved. For example, a ratio A (A=Rmeasure/Rtarget) is determined, where Rmeasure is a measured transmission rate determined with respect to a packet which has been transmitted up to the current time, and Rtarget is a target transmission rate predetermined for each service. When it is to be judged whether or not the service quality is satisfied, the judgment for the current time can be performed by setting the condition such that A<1.0.

According to another example, when an elapsed time T relative to the current time from the time of the last transmission by an identical packet call with respect to a packet from each of the mobile stations 3-1 to 3-4, is calculated and the mobile stations are ranked in order of the longer elapsed time T, a plurality of mobile stations having higher ranking are selected. According to still another example, when the elapsed time T is compared with a threshold T1, a plurality of mobile stations in which T exceeds T1 are selected.

The mobile station notification unit 133 assigns a transmission opportunity to a mobile station determined by the PF scheduler 132. As a metric calculated from radio channel quality, the PF scheduler 132 may employ a ratio of instantaneous radio channel quality to average radio channel quality calculated from a plurality of past instantaneous radio channel qualities. Alternatively, as the metric, a value obtained by normalizing the difference between the instantaneous radio channel quality and the average radio channel quality by use of the average radio channel quality may be employed. In either case, since relative instantaneous radio channel quality with respect to the average radio channel quality is calculated, it is possible to fairly assign a transmission opportunity.

After a mobile station is determined by the PF scheduler 132, if there is some margin for radio resource (Step S4 in FIG. 3) and there exists a mobile station having data to be transmitted (Step S5 in FIG. 3), then the mobile station notification unit 133 repeats the transmission opportunity assignment with respect to the mobile stations selected by the mobile station selection unit 131 and having not yet received a transmission opportunity, until the radio resource runs out or the number of the mobile stations having data to be transmitted is reduced to zero. Upon completion of the transmission opportunity assignment, the mobile station notification unit 133 notifies the data flow control unit 10 of the mobile stations to which a transmission opportunity has been assigned (Step S6 in FIG. 3).

As described above, according to the present embodiment, since a mobile station to which a transmission opportunity is assigned is determined from a plurality of mobile stations selected in accordance with the service quality, it is possible to assign a transmission opportunity to a mobile station having satisfactory radio channel quality with respect to mobile stations which don't achieve the service quality.

In addition, since the transmission opportunity assignment is performed not by use of the instantaneous radio channel quality, but by use of the PF method based on the metric which is calculated from the instantaneous radio channel quality, fair assignment can be achieved. Thus, according to the present embodiment, it is possible to achieve high throughput while attaining the quality guarantee for each of the mobile stations 3-1 to 3-4 and fairly assigning a transmission opportunity.

Figure 4:
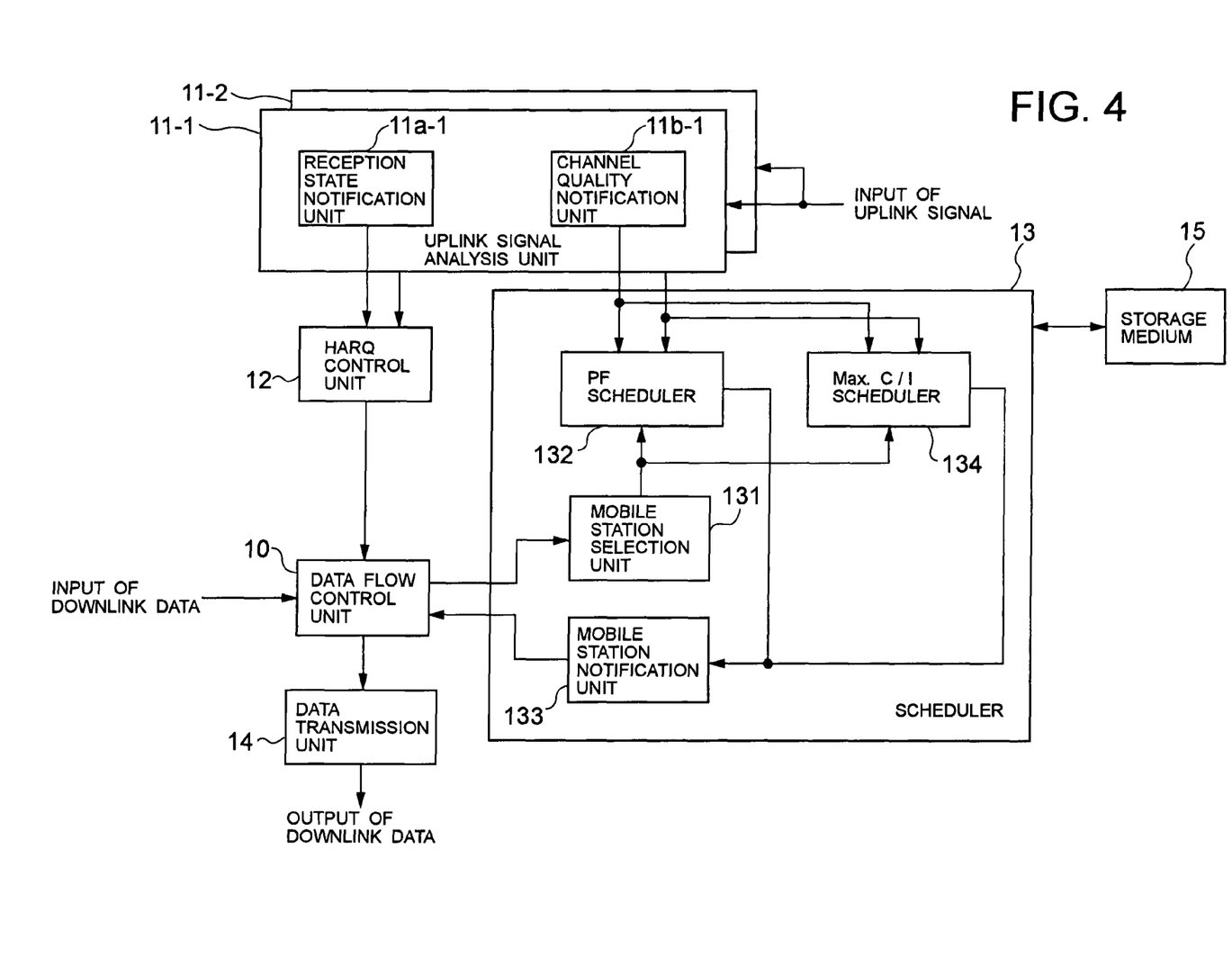
FIG. 4 is a block diagram showing the configuration of a radio base station according to another embodiment of the present invention.

FIG. 4 is a block diagram showing the configuration of a radio base station according to another embodiment of the present invention. Referring to FIG. 4, the radio base station according to another embodiment of the present invention has the same configuration as the radio base station 2 according to the aforementioned embodiment of the present invention shown in FIG. 2, except that a MAX. C/I [Maximum CIR] scheduler 134 is added to the scheduler 13. Thus, in FIG. 4, the same reference numerals are applied to components corresponding to FIG. 1. Though not shown, the configuration of a mobile communication system according to another embodiment of the present invention is identical to that of the mobile communication system according to the aforementioned embodiment shown in FIG. 1.

The data flow control unit 10 is connected to a radio network controller 1, a HARQ control unit 12, a scheduler 13, and a data transmission unit 14, respectively. In uplink signal analysis units 11-1, 11-2, the reception state notification units 11a-1, 11a-2 are connected to the HARQ control unit 12, and the channel quality notification units 11b-1, 11b-2 are connected to a PF scheduler 132 in the scheduler 13 and a MAX. C/I scheduler 134.

A radio base station 2 which has received an uplink signal analyzes the uplink signal by means of uplink signal analysis units 11-1, 11-2 provided for each of the mobile stations 3-1 to 3-4. Since the uplink signal has reception state and channel quality, the analysis results from the reception state notification units 11a-1, 11a-2 and the channel quality notification units 11b-1, 11b-2 are sent to the HARQ control unit 12 and the scheduler 13, respectively.

The HARQ control unit 12 decides whether or not retransmission is needed in accordance with the analysis results of the reception state notification units 11a-1, 11a-2 and sends the resultant judgment to the data flow control unit 10.

Upon receipt of data from the radio network controller 1, the data flow control unit 10 stores the data in a buffer whose data has not been transmitted (not shown) and sends the data to the data transmission unit 14 in response to an instruction from a mobile station notification unit 133.

When transmitting the data in the buffer whose data has not been transmitted, the data flow control unit 10 moves the data from the buffer whose data has not been transmitted to a buffer whose data has been transmitted (not shown). When the data flow control unit 10 transmits the data in the buffer whose data has been transmitted (a retransmission case), it transmits data from the buffer whose data has been transmitted, and then stores the data as is. The data transmission unit 14 applies error correction code with respect to the data from the data flow control unit 10 and modulates the corrected data to transmit it to the corresponding mobile stations.

On the other hand, when the data flow control unit 10 receives from the HARQ control unit 12 some notification that retransmission is not required, the data flow control unit 10 discards the data which have been stored in the buffer whose data has been transmitted. In contrast, when the data flow control unit 10 receives from the HARQ control unit 12 some notification that retransmission is required, it stores the data in the buffer whose data has been transmitted as is.

Figure 5:
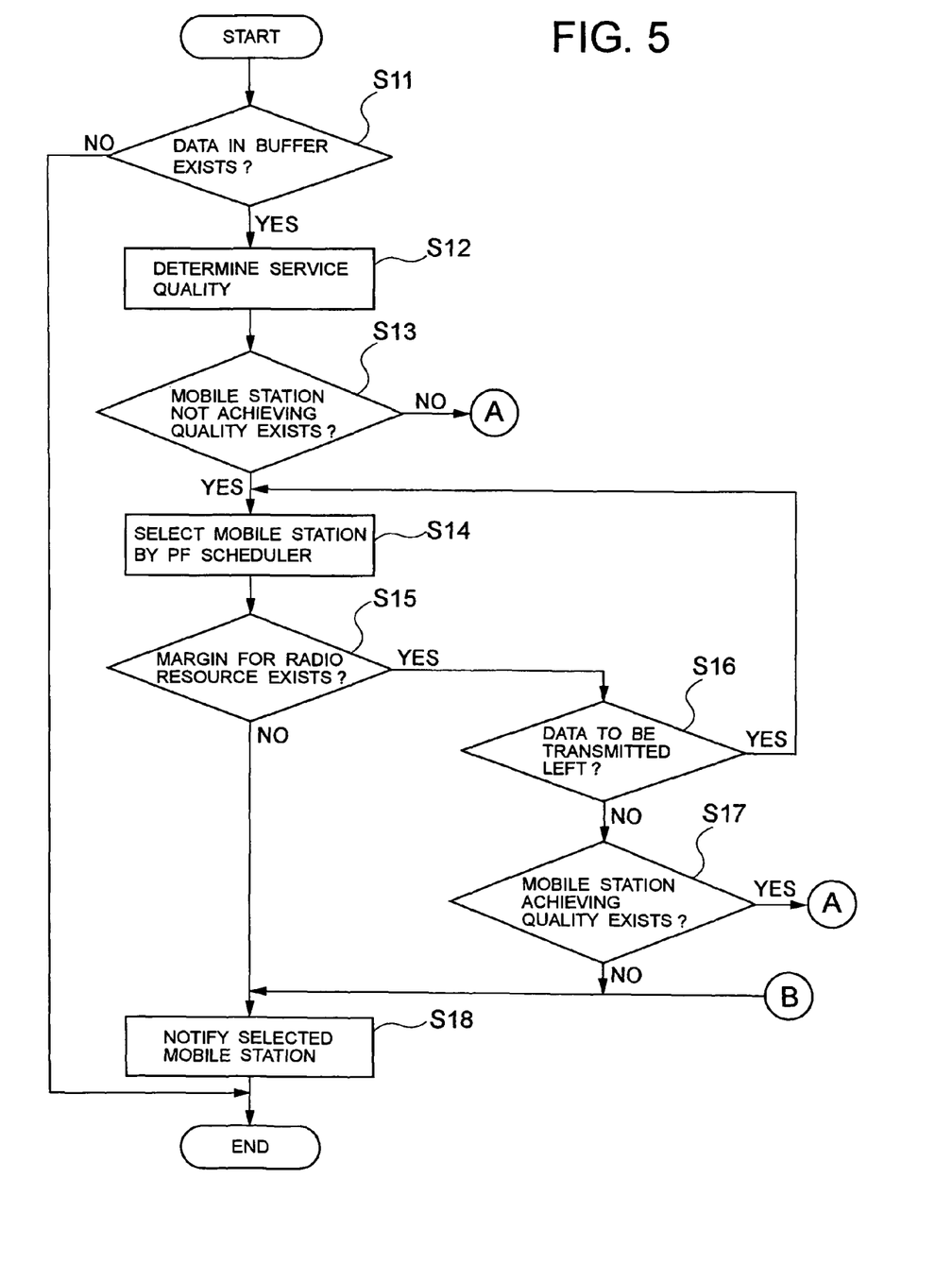
FIG. 5 is a flowchart of the operation of a scheduler shown in FIG. 4.
Figure 6:
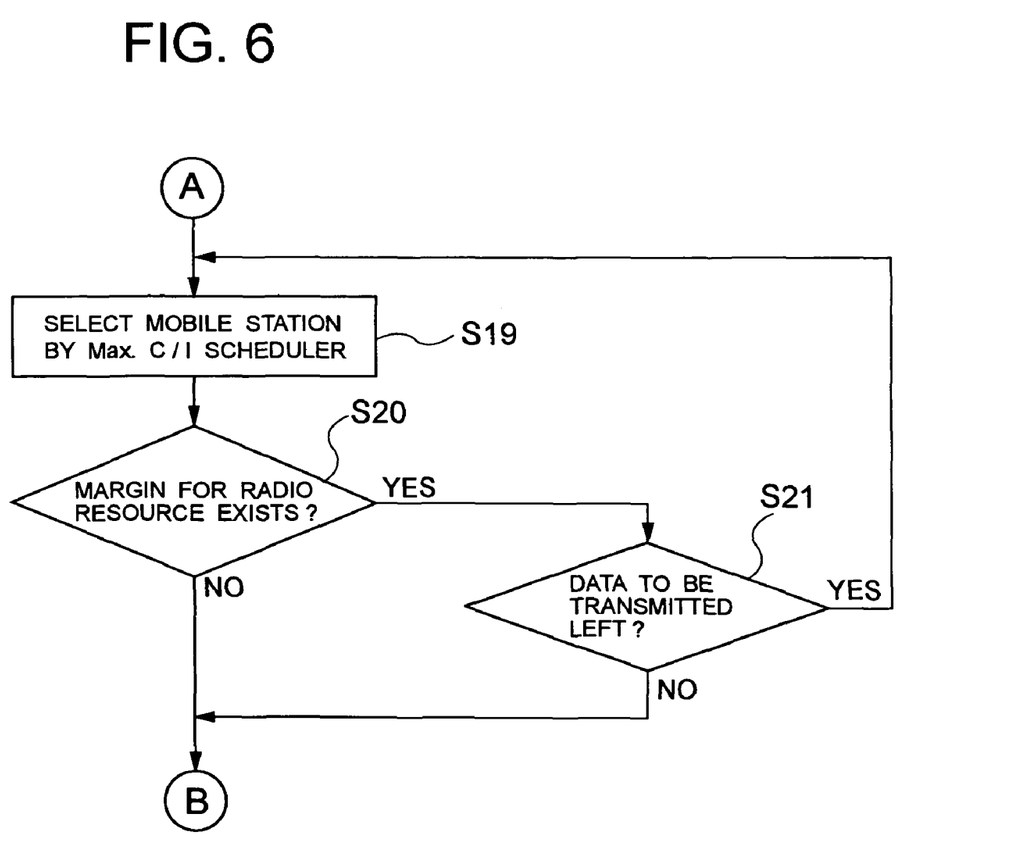
FIG. 6 is a flowchart of the operation of the scheduler shown in FIG. 4.

FIG. 5 and FIG. 6 are flowcharts illustrating the operation of the scheduler 13 shown in FIG. 4. The operation of the scheduler 13 will be described hereunder with reference to FIGS. 4 to 6. It is noted that the operation shown in FIG. 5 and FIG. 6 is implemented when the scheduler 13 executes the program stored in a storage medium 15.

When a mobile station selection unit 131 is notified by the data flow control unit 10 at a fixed period of time (packet transmission period) with respect to a mobile station which has data to be transmitted (Step S11 in FIG. 5), the unit 131 determines the service quality (Step S12 in FIG. 5) to decide whether or not there exists a mobile station which does not achieve the service quality (Step S13 in FIG. 5).

When the mobile station selection unit 131 decides that there exist some mobile stations which don't achieve the service quality, the unit 131 selects a plurality of mobile stations from these stations. The PF scheduler 132 determines a mobile station to which a transmission opportunity is assigned, with respect to the mobile stations thus selected (Step S14 in FIG. 5).

When there exists no mobile station selected by the mobile station selection unit 131 (there exists no mobile station which does not achieve the service quality), the Max. C/I scheduler 134 determines a mobile station to which a transmission opportunity is assigned (Step S19 in FIG. 6). It is noted that the service quality as used herein is identical to that of the aforementioned embodiment of the present invention and an explanation thereof is omitted. When the PF scheduler 132 or the Max. C/I scheduler 134 assigns a transmission opportunity to a plurality of mobile stations, the same operation takes place.

After a mobile station to which a transmission opportunity is assigned is determined, if there is some margin for radio resource (Step S15 in FIG. 5, Step S20 in FIG. 6) and there still exists a mobile station to which a transmission opportunity is to be assigned (Step S16 in FIG. 5, Step S21 in FIG. 6), then the scheduler 13 repeats the transmission opportunity assignment with respect to the mobile stations selected by the mobile station selection unit 131 and having not yet received a transmission opportunity, until the radio resource runs out or the number of the mobile stations having data to be transmitted is reduced to zero.

In the scheduler 13, if there exists no mobile station which does not achieve the service quality (Step S13 in FIG. 5) or there is some margin for radio resource after having assigned a transmission opportunity to all mobile stations selected by the PF scheduler 132 (Step S15 to Step S17 in FIG. 5), then a transmission opportunity is assigned to a mobile station by the Max. C/I scheduler 134 (Step S19 in FIG. 6). When the transmission opportunity assignment is completed, the mobile station notification unit 133 notifies the data flow control unit 10 of the mobile stations to which a transmission opportunity has been assigned (Step S18 in FIG. 5).

As described above, according to the present embodiment, when the service quality is achieved in all mobile stations, a transmission opportunity is assigned by the Max. C/I method, whereby the improvement of throughput can be expected. Consequently, according to the present embodiment, it is possible to implement the packet scheduler 13 which can achieve high throughput while attaining the target quality for each mobile station and fairly assigning a transmission opportunity.

What is claimed is:

1. A mobile communications system having a plurality of mobile stations for transmitting radio channel quality information using an uplink dedicated channel and a radio base station for communicating with the plurality of mobile stations and transmitting a packet to the plurality of mobile stations using a downlink shared channel, said radio base station comprising:
   selecting means selecting a subset of the plurality of mobile stations in which the transmission state of the packet fails to achieve a predetermined radio channel quality, wherein as a transmission state of the packet, an elapsed time relative to the present time from a transmission time of a last packet transmitted before the current time, is employed, the selecting means selecting the subset of the plurality of mobile stations in order of longer elapsed time;
   first deciding means deciding a mobile station to which a transmission opportunity is assigned in accordance with a PF scheduler metric, with respect to the subset of the plurality of mobile stations selected by the selecting means; and
   second deciding means deciding a mobile station to which a transmission opportunity is assigned in accordance with a Max C/I scheduler, when no mobile station fails to achieve the predetermined radio channel quality.

2. The mobile communication system according to claim 1, wherein the selecting means selects a subset of the plurality of mobile stations in which the elapsed time is longer than a predetermined time.

3. The mobile communication system according to claim 1, wherein the transmission state of the packet is obtained by determining a ratio of a measured transmission rate to a target transmission rate predetermined for each mobile station.

4. The mobile communication system according to claim 3, wherein the selecting means selects a mobile station in which a ratio of the measured transmission rate to a target transmission rate predetermined for each mobile station is a predetermined value or smaller.

5. The mobile communication system according to claim 1, wherein the PF scheduler metric is obtained by calculating a ratio of instantaneous radio channel quality to average radio channel quality calculated from a plurality of past instantaneous radio channel qualities.

6. The mobile communication system according to claim 1, wherein the PF scheduler metric is obtained by calculating a ratio of the average radio channel quality obtained by averaging the plurality of past instantaneous radio channel qualities to a difference between the instantaneous radio channel quality and the average radio channel quality.

7. A radio base station which communicates with a plurality of mobile stations for transmitting radio channel quality information using an uplink dedicated channel and transmits a packet to the plurality of mobile stations using a downlink shared channel, comprising:

selecting means selecting a subset of the plurality of mobile stations in which the transmission state of the packet fails to achieve a predetermined radio channel quality, wherein as a transmission state of the packet, an elapsed time relative to the present time from a transmission time of a last packet transmitted before the current time, is employed, the selecting means selecting the subset of the plurality of mobile stations in order of longer elapsed time;

first deciding means deciding a mobile station to which a transmission opportunity is assigned in accordance with a PF scheduler metric, with respect to the subset of the plurality of mobile stations selected by the selecting means; and second deciding means deciding a mobile station to which a transmission opportunity is assigned in accordance with a Max C/I scheduler, when no mobile station fails to achieve the predetermined radio channel quality.

8. The radio base station according to claim 7, wherein the selecting means selects a subset of the plurality of mobile stations in which the elapsed time is longer than a predetermined time.

9. The radio base station according to claim 7, wherein the transmission state of the packet is obtained by determining a ratio of a measured transmission rate to a target transmission rate predetermined for each mobile station.

10. The radio base station according to claim 9, wherein the selecting means selects a mobile station in which a ratio of the measured transmission rate to a target transmission rate predetermined for each mobile station is a predetermined value or smaller.

11. The radio base station according to claim 7, wherein the PF scheduler metric is obtained by calculating a ratio of instantaneous radio channel quality to average radio channel quality calculated from a plurality of past instantaneous radio channel qualities.

12. The radio base station according to claim 7, wherein the PF scheduler metric is obtained by calculating a ratio of the average radio channel quality obtained by averaging the plurality of past instantaneous radio channel qualities to a difference between the instantaneous radio channel quality and the average radio channel quality.

13. A scheduling apparatus which draws a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel, comprising:

selecting means selecting a subset of the plurality of mobile stations in which the transmission state of the packet fails to achieve a predetermined radio channel quality, wherein as a transmission state of the packet, an elapsed time relative to the present time from a transmission time of a last packet transmitted before the current time, is employed, the selecting means selecting the subset of the plurality of mobile stations in order of longer elapsed time;

first deciding means deciding a mobile station to which a transmission opportunity is assigned in accordance with a PF scheduler metric, with respect to the subset of the plurality of mobile stations selected by the selecting means; and second deciding means deciding a mobile station to which a transmission opportunity is assigned in accordance with a Max C/I scheduler, when no mobile station fails to achieve the predetermined radio channel quality.

14. The scheduling apparatus according to claim 13, wherein the selecting means selects a subset of the plurality of mobile stations in which the elapsed time is longer than a predetermined time.

15. The scheduling apparatus according to claim 13, wherein the transmission state of the packet is obtained by determining a ratio of a measured transmission rate to a target transmission rate predetermined for each mobile station.

16. The scheduling apparatus according to claim 15, wherein the selecting means selects a mobile station in which a ratio of the measured transmission rate to a target transmission rate predetermined for each mobile station is a predetermined value or smaller.

17. The scheduling apparatus according to claim 13, wherein the PF scheduler metric is obtained by calculating a ratio of instantaneous radio channel quality to average radio channel quality calculated from a plurality of past instantaneous radio channel qualities.

18. The scheduling apparatus according to claim 13, wherein the PF scheduler metric is obtained by calculating a ratio of the average radio channel quality obtained by averaging the plurality of past instantaneous radio channel qualities to a difference between the instantaneous radio channel quality and the average radio channel quality.

19. A scheduling method for drawing a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel, comprising:

a first step of selecting a subset of the plurality of mobile stations in which the transmission state of the packet fails to achieve a predetermined radio channel quality, wherein as a transmission state of the packet, an elapsed time relative to the present time from a transmission time of a last packet transmitted before the current time, is employed, the first step selecting the subset of the plurality of mobile stations in order of longer elapsed time;

a second step of deciding a mobile station to which a transmission opportunity is assigned in accordance with a PF scheduler metric, with respect to the subset of the plurality of mobile stations thus selected; and a third step of deciding a mobile station to which a transmission opportunity is assigned in accordance with a Max C/I scheduler, when no mobile station fails to achieve the predetermined radio channel quality.

20. The scheduling method according to claim 19, wherein the first step selects a subset of the plurality of mobile stations in which the elapsed time is longer than a predetermined time.

21. The scheduling method according to claim 19, wherein the transmission state of the packet is obtained by determining a ratio of a measured transmission rate to a target transmission rate predetermined for each mobile station.

22. The scheduling method according to claim 21, wherein the first step selects a mobile station in which a ratio of the measured transmission rate to a target transmission rate predetermined for each mobile station is a predetermined value or smaller.

23. The scheduling method according to claim 19, wherein the PF scheduler metric is obtained by calculating a ratio of instantaneous radio channel quality to average radio channel quality calculated from a plurality of past instantaneous radio channel qualities.

24. The scheduling method according to claim 19, wherein the PF scheduler metric is obtained by calculating a ratio of the average radio channel quality obtained by averaging the plurality of past instantaneous radio channel qualities to a difference between the instantaneous radio channel quality and the average radio channel quality.

25. A computer-readable non-transitory medium storing a program for use with a scheduling method for drawing a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel, the program causing a computer of said radio base station to perform:

- a first process for selecting a subset of the plurality of mobile stations in which the transmission state of the packet fails to achieve a predetermined radio channel quality, wherein as a transmission state of the packet, an elapsed time relative to the present time from a transmission time of a last packet transmitted before the current time, is employed, the first process selecting the subset of the plurality of mobile stations in order of longer elapsed time;
- a second process for deciding a mobile station to which a transmission opportunity is assigned in accordance with a PF scheduler metric, with respect to the subset of the plurality of mobile stations thus selected; and
- a third process for deciding a mobile station to which a transmission opportunity is assigned in accordance with a Max C/I scheduler, when no mobile station fails to achieve the predetermined radio channel quality.

* * * * *